United States Patent
Gauthier et al.

(10) Patent No.: US 6,718,078 B2
(45) Date of Patent: Apr. 6, 2004

(54) HIGH SENSITIVITY FIBER OPTIC ROTATION SENSOR

(75) Inventors: Benoit G. Gauthier, Little Compton, RI (US); Frank J. Sienkiewicz, Bristol, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 32 days.

(21) Appl. No.: 10/230,442

(22) Filed: Aug. 27, 2002

(65) Prior Publication Data

US 2004/0042704 A1 Mar. 4, 2004

(51) Int. Cl.[7] .............................. G02B 6/00; G02B 6/36
(52) U.S. Cl. ..................... 385/13; 250/227.16; 385/147
(58) Field of Search ...................... 250/227.11, 227.16; 385/12, 24, 147

(56) References Cited

U.S. PATENT DOCUMENTS

| | | | | |
|---|---|---|---|---|
| 3,807,635 A | * | 4/1974 | Platt | 239/726 |
| 4,260,566 A | * | 4/1981 | Brouwer et al. | 264/408 |
| 4,358,678 A | * | 11/1982 | Lawrence | 250/227.14 |
| 4,436,995 A | * | 3/1984 | Whitten | 250/227.16 |
| 4,472,628 A | * | 9/1984 | Whitten | 250/227.14 |
| 4,552,026 A | * | 11/1985 | Knudsen et al. | 73/861.24 |
| 4,734,577 A | * | 3/1988 | Szuchy | 250/227.16 |
| 4,891,511 A | * | 1/1990 | Reed | 250/227.16 |
| 5,018,816 A | * | 5/1991 | Murray et al. | 385/16 |
| 5,134,281 A | * | 7/1992 | Bryenton et al. | 250/227.16 |
| 5,193,129 A | * | 3/1993 | Kramer | 385/13 |
| 5,274,336 A | * | 12/1993 | Crook et al. | 324/690 |

* cited by examiner

*Primary Examiner*—Akm Enayet Ullah
(74) *Attorney, Agent, or Firm*—James M. Kasischke; Michael F. Oglo; Jean-Paul A. Nasser

(57) ABSTRACT

The present invention relates to a fiber optic rotation sensing device. The sensing device includes a stationary base, a rotatable member, and an optical fiber configured in at least one loop about the rotatable member. The optical fiber is secured to an exterior portion of the rotatable member and to the base. Rotation of the rotatable member causes a distortion of the at least one loop and a change in the intensity of the light passing through the optical fiber. The change in light intensity is measured to provide an indication of the degree of twist of the rotatable member.

9 Claims, 1 Drawing Sheet

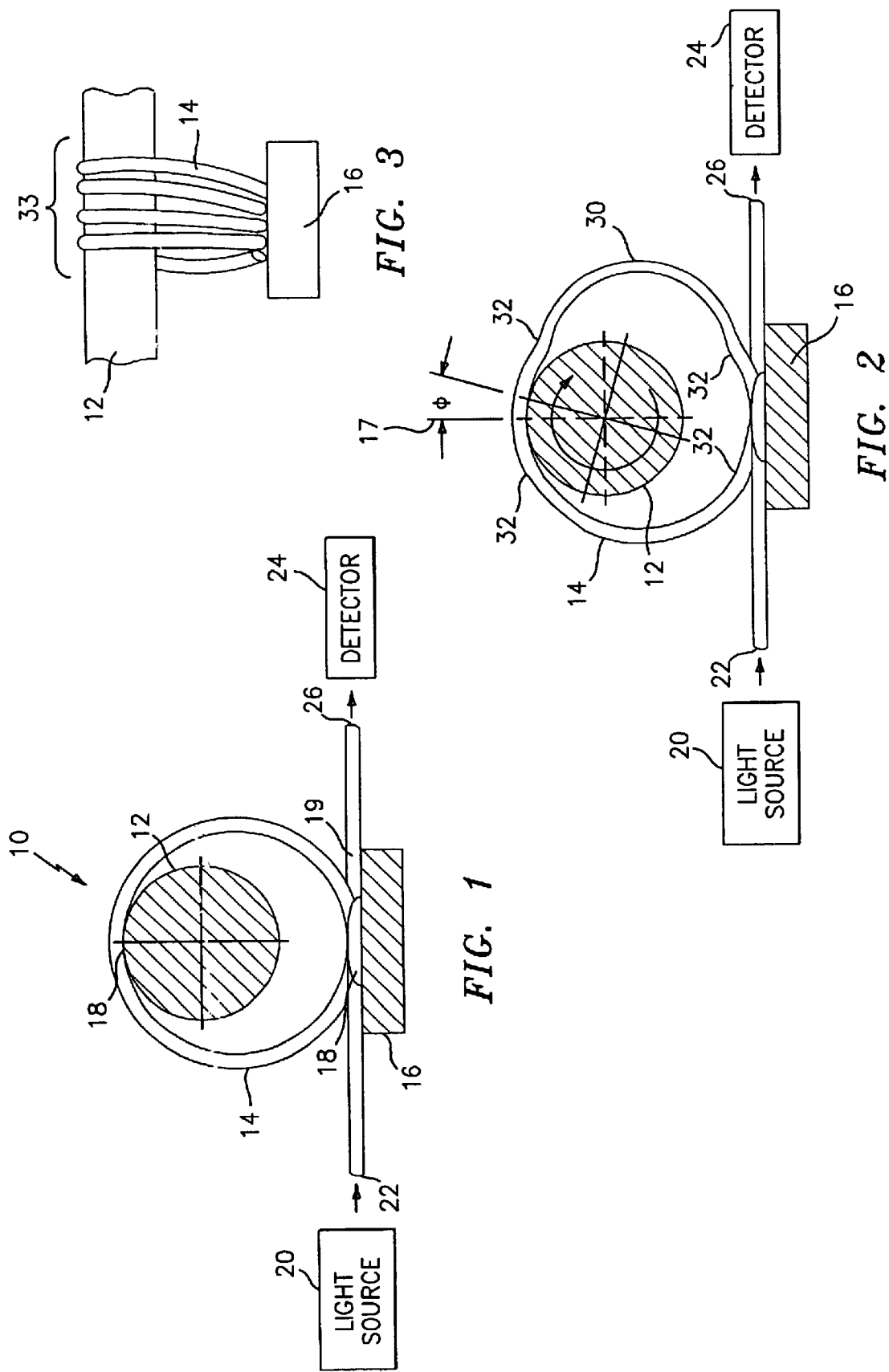

HIGH SENSITIVITY FIBER OPTIC ROTATION SENSOR

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

Not applicable.

BACKGROUND OF THE INVENTION (1) Field of the Invention

The present invention relates to a high sensitivity fiber optic rotation sensor.

(2) Description of the Prior Art

A microbend fiber optic sensor gives changes in the intensity of transmitted light in response to changes in fiber curvature. As curvature increases (bend radius decreases), a portion of the light traveling through the fiber is lost through dispersion and diffraction through the fiber wall. Fibers are used as sensors by measuring the change in transmitted light intensity. The physics of intensity based fiber optic sensors using microbends was first published by G. Zeidler, A. Hasselberg, and D. Schickentanz in their paper: "Effects of Mechanically Induced Periodic Bends on the Optical Loss of Glass Fibers", *Optics Communications*, Vol. 18, pp. 553–555, 1976. These investigators demonstrated the loss of intensity due to bending a fiber between a pair of plates with meshing, corrugated surfaces. Increasing the curvature by moving the plates together increased transmission loss.

An alternative configuration, the figure eight topology, was developed in 1993 at the University of Rhode Island by Sienkiewicz, Shukla, Letcher, Sing and Zhou in their paper: "On the Use of Microbend Fiber Optic Sensors in Material Characterization", *SPIE*, vol. 2072, pp. 214–233. These configurations use a tightening of the curvature of the fiber to increase the intensity loss of the fiber. One such figure eight sensor is shown in U.S. Pat, No. 4,358,678 to Lawrence.

These prior art sensors have relatively low sensitivity and require cumbersome loading fixtures.

Devices for sensing a degree of rotation for angular disposition are known in the art. For example, U.S. Pat. No. 4,633,079 to Rieger illustrates a sensor for measuring the degree of articulation of finger joints in a remote underwater vehicle. The sensor uses a length of an optical fiber connected to each finger joint. As the joint is rotated, the bending of the optical fiber changes the attenuation of light through the fibers and a detector monitoring this change provides a signal that is correlated to the degree of articulation.

U.S. Pat. No. 5,274,226 to Kidwell et al. illustrates a single optical fiber which is used to measure angular or rotational position in a rotary sensor. The optical fiber is used in connection with known analog intensity optoelectronics and with a microbending device housed within the sensor. An input shaft of the sensor experiencing rotational motion causing the microbending device to subject the optical fiber to microbending. Microbending can be caused by a loading arrangement such as a crankpin, pins located on the shaft within the housing, or a transverse hole located through the shaft. A micrometer lead screw can be used within the housing to convert the rotational motion into linear motion. The converted linear displacement is used to compress the optical fiber. Where the input shaft experiences many rotations or multiple turns, the linear displacement can be applied to a spring element carrying a load or force to a compression device. Microbending experienced by the optical fiber causes a change in the fiber radius of curvature. These microbending losses are then measured by the optoelectronics or photodetection arrangements.

U.S. Pat. No. 4,436,995 to Whitten illustrates a transducer for sensing the magnitude of a parameter, such as mechanical displacement/motion, pressure, temperature, electrical voltage, and current, which uses a multimode optical waveguide fiber. At least one portion of the fiber is subjected to bending in an amount changing with a change in the sensed parameter magnitude. The resulting microbending losses in the fiber vary the attenuation of light energy between an optical source and an optical detector.

U.S. Pat. No. 4,552,026 to Knudsen et al. illustrates a fiber optic device for sensing the generation of vortices by measuring the torsional displacement of a bluff body mounted for rotation about its center of inertia within a fluid conduit. An internally toothed member is fixed to the outside of the fluid conduit, and an externally toothed member is fixed to the bluff body for rotation therewith and is in partial meshing relation to the externally toothed member. An optical fiber is entrained between the toothed members and has one end exposed to a light source and the opposite end connected to a detector which is operable to detect changes in the intensity of the light transmitted through the fiber. As the bluff body vibrates, the toothed members are displaced relative to one another causing changes in the radius of curvature of the segments of the optical fiber received between the teeth, thus changing the intensity of light transmitted through the fiber in proportion to the changes in the radius of curvature.

U.S. Pat. No. 5,260,566 to Reed illustrates a sensor which includes an optical fiber sensor which has a microbend module engaged thereto. When the module is subjected to external influences such as pressure and displacement, it places microbends in the sensor fiber which changes a light transmission characteristic of the fiber. Light passing through the sensor fiber is detected, and changes in the light are measured to find the influence on the modulator.

U.S. Pat. No. 4,891,511 to Reed illustrates a fiber optic microbend sensor with a braided arrangement of multiple optical fibers such that the length dependent microbending losses result from the interaction of the fibers themselves without the need for additional external structures such as corrugated plates.

U.S. Pat. No. 4,734,577 to Szuvhy illustrates a fiber optic load measuring system which comprises a light source, a fiber optic attenuator, a photodetector, and a signal processor. The fiber optic attenuator was formed to have a curved portion along the length thereof disposed in low transfer relation with the surface where the load is measured. The signal processor is adapted to receive signals from the photodetector and measure variations attributable to the application of a load on the surface. The processor is further adapted to linearly translate the detected variations to compute deformation of the curved portion in response to an applied load.

U.S. Pat. No. 5,134,281 to Bryenton et al. illustrates an optical sensor comprising an optical fiber having a core covered by a cladding, the cladding having an index of refraction different from that of the core, apparatus for retaining the fiber in a sinuously looped disposition, apparatus for fixing the fiber to an object to be sensed whereby movement to be sensed results in one or both of according expansion and contraction of loops of the fiber and microbending of the fiber, apparatus for applying a first optical signal into one end of the fiber, apparatus for detecting a resulting optical signal from the other end of the fiber, and apparatus for comparing the first and resulting optical signals to obtain an indication of the movement.

U.S. Pat. No. 5,193,129 to Kramer illustrates a pressure detector having a fiber optical cable woven through a ladder like structure which is then encapsulated and surrounded by a cover. Light transmitted through the fiber optic cable is diminished to a value less than a threshold value upon the occurrence of microbending caused by pressure applied at any location along the length thereof. The rungs of the ladder like structure are sized and spaced to provide a proper locus about which microbending may be produced.

Despite these various types of optic fiber sensors, there remains a need for a sensor which provides very high output sensitivity for low physical or rotary input.

SUMMARY OF THE INVENTION

Accordingly, it is an object of the present invention to provide a rotation sensing device which provides very high output sensitivity.

It is a further object of the present invention to provide a rotation sensing device which does not require cumbersome loading fixtures.

The foregoing objects are attained by the fiber optic rotation sensing device of the present invention.

In accordance with the present invention, a fiber optic rotation sensing device is provided. The fiber optic rotation sensing device broadly comprises a stationary base, a rotatable member, and an optical fiber configured in at least one loop about the rotatable member. The optical fiber is affixed to an exterior portion of the rotatable member and to the base. Rotation of the rotatable member causes a distortion of the at least one loop in the optical fiber and a change in the intensity of the light passing through the optical fiber. The change in light intensity is measured to provide an indication of the degree of twist of the rotatable member.

Other details of the fiber optic rotation sensing device of the present invention, as well as other objects and advantages attendant thereto, are set forth in the following detailed description and the accompanying drawings wherein like reference numerals depict like elements.

BRIEF DESCRIPTION OF THE DRAWINGS

FIG. 1 is a sectional view of a fiber optic rotation sensing device of the present invention; and FIG. 2 is a sectional view of the fiber optic rotation sensing device after the member being sensed has been rotated.

FIG. 3 is a side view of an alternative embodiment of a sensing device in accordance with the present invention illustrating an optical fiber configured in more than one loop around a rotatable member.

DESCRIPTION OF THE PREFERRED EMBODIMENT(S)

Referring now to FIG. 1, a sensor device 10 for detecting rotation of a member 12, such as an armature, is illustrated. The sensor device 10 includes at least one multimode optical fiber 14 configured in at least one loop around the rotatable member 12 which is supported on a stationary base 16. The optical fiber 14 is affixed to the stationary base 16 and to the rotatable member 12 along the lines 18. As can be seen from FIG. 1, the lines or affixation points 18 lie along an axis which is substantially perpendicular to a surface 19 of the base 16, and co-linear to the axis of rotation of member 12. While any suitable means known in the art may be used to affix the optical fiber 14 to the stationary base 16 and the rotatable member 12, it is preferred to bond the optical fiber 14 to the base 16 and the member 12 along the bond lines 18. Any suitable adhesive material known in the art may be used to effect these bonds.

The optical fiber 14 is connected to a light source 20 at an input end 22 and connected to a detection device 24, such as a photodetector, at the output end 26. The light source 20 transmits light through the optical fiber 14 and the detection device 24 detects any change or drop in transmitted light intensity which results from rotation of the member 12.

FIG. 2 shows the sensor device 10 with the rotatable member 12 rotated through an angle $\phi$ with respect to an axis 17 which penetrates the base 16. Because the optical fiber 14 is affixed to the rotatable member 12 and the base 16, the rotation of the rotatable member 12 causes a distortion of the optical fiber 14 from the circular loop path of FIG. 1 to a non-circular path with a greater curvature 30. As can be seen from FIG. 2, the radius of curvature of the optical fiber 14 is greatly decreased in a manner approximating kinks at four points 32 local to the bond lines 18. Light propagating from the input end 22 to the output end 26 is attenuated in amplitude due to refractive and dispersive losses in these high curvature regions. The drop in transmitted light intensity measured by the detection device 24 is directly proportional to the angle of twist of the rotatable member 12. A high sensitivity fiber optic rotary sensor device is thus provided.

The main advantage of the present invention is the high sensitivity as compared to previous devices. The relative motion between the rotatable member 12 and the base 16 produces a very high local fiber curvature, approaching kinking. Moreover, the high curvature occurs at four points on the fiber loop. This local curvature provides a high transmission loss per unit of rotation. An additional feature of the present invention which increases the sensitivity is the use of multiple sensing loops of fiber on a single armature. The use of multiple loops 33 as shown in FIG. 3 allows this high sensitivity device to be very compact.

The device of the present invention may be configured with any type of fiber, light source, and sensor which transmit and receive light incompatible wavelengths. The optical fiber 14 may be a glass, plastic, or rare earth material, depending on the sensitivity and cost constraints of the design.

If desired, the optical fiber(s) 14 need not wrap around the member 12. A variety of arrangements can be envisioned which impose the rapid curvature change with relative motion.

The optical fiber 14 may be bonded in more than one location to the member 12, thereby increasing the number of deflection points and further enhancing sensitivity.

It is apparent that there has been provided a fiber optic rotation sensing device which fully satisfies the objects, means and advantages set forth hereinbefore. While the invention has been described in the context of specific embodiments thereof, other alternatives, modifications, and variations will become apparent to those skilled in the art having read the foregoing description. Therefore, it is intended to embrace such alternatives, modifications, and variations as fall within the broad scope of the appended claims.

What is claimed is:

1. A fiber optic rotation sensing device comprising:

a stationary base;

a rotatable member;

at least one optical fiber configured in at least one loop about said rotatable member;

said optical fiber being affixed to an exterior portion of said rotatable member and to said base; and means for determining a loss in intensity of light passing through said at least one optical fiber caused by rotation of said rotatable member and the distortion of said at least one loop in said at least one optical fiber.

2. A fiber optic rotation sensing device according to claim 1, wherein said determining means comprises a light source connected to an input end of said at least one optical fiber for inputting light at a first intensity and detection means inputting light at a first intensity and detection means attached to an output end of said at least one optical fiber for detecting changes in light intensity in said at least one optical fiber as a result of said rotation of said rotatable member.

3. A fiber optic rotation sensing device according to claim 2, wherein said detection means comprises a photodetector.

4. A fiber optic rotation sensing device according to claim 1, wherein said optical fiber is bonded to said exterior portion of said rotatable member at least one location.

5. A fiber optic rotation sensing device according to claim 1, wherein said optical fiber is bonded to said exterior portion of said rotatable member at a plurality of locations.

6. A fiber optic rotation sensing device according to claim 1, further comprising a plurality of optical fibers affixed to said rotatable member and each of said optical fibers configured in at least one loop about said rotatable member.

7. A fiber optic rotation sensing device according to claim 1, wherein said rotatable member is an armature.

8. A fiber optic rotation sensing device according to claim 1, wherein:

said at least one optical fiber is affixed to said exterior portion of said rotatable member at a first point and to said base at a second point; and said first point and a second point lie along an axis which is substantially perpendicular to a surface of said base.

9. A fiber optic rotation sensing device according to claim 1, wherein each said optical fiber is configured in more than one loop around said rotatable member.

* * * * *